United States Patent [19]
Lund

[11] Patent Number: 5,304,396
[45] Date of Patent: Apr. 19, 1994

[54] METHOD FOR SEALING CABLE CONDUITS
[75] Inventor: William J. Lund, Stockton, Calif.
[73] Assignee: Vernon Auten, Stockton, Calif.
[21] Appl. No.: 927,977
[22] Filed: Aug. 11, 1992

Related U.S. Application Data
[62] Division of Ser. No. 787,122, Nov. 4, 1991.
[51] Int. Cl.⁵ .................................................. B05D 7/22
[52] U.S. Cl. ...................................... 427/230; 427/58; 427/236; 174/76
[58] Field of Search ................ 427/236, 243, 230, 58; 174/76, 77 R, 110 S; 138/89, 108; 239/320, 321, 567; 222/145, 325, 95

[56] References Cited
U.S. PATENT DOCUMENTS

| | | | |
|---|---|---|---|
| 3,186,645 | 6/1965 | Eberlein | 239/567 |
| 3,383,257 | 5/1968 | James | 427/236 |
| 3,427,393 | 2/1969 | Masterson | 174/76 |
| 3,774,403 | 11/1973 | Cushing | 138/105 |
| 4,801,008 | 1/1989 | Rich | 222/566 |
| 5,066,518 | 11/1991 | Klingen | 427/236 |

Primary Examiner—Shrive Beck
Assistant Examiner—Katherine A. Bareford
Attorney, Agent, or Firm—Walter A. Hackler

[57] ABSTRACT

A method for sealing cable conduits utilizes a spray nozzle which includes at least two compartments for holding chemical compositions in a spaced apart while a piston is utilized for simultaneously forcing the chemical compositions out of the compartments and into an elongate nozzle for commingling the chemical compositions and introducing the commingled compositions into the end of a cable conduit in a direction generally perpendicular to an axis of the elongate nozzle to cause complete wetting of the conduit inner surface with the commingled composition before foaming thereof.

6 Claims, 3 Drawing Sheets

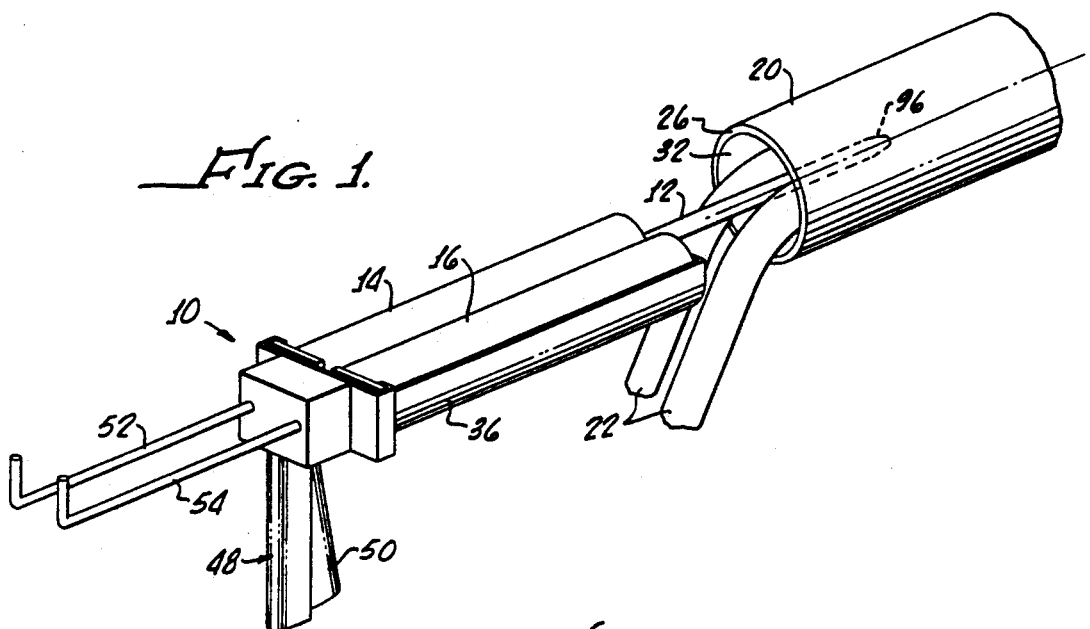
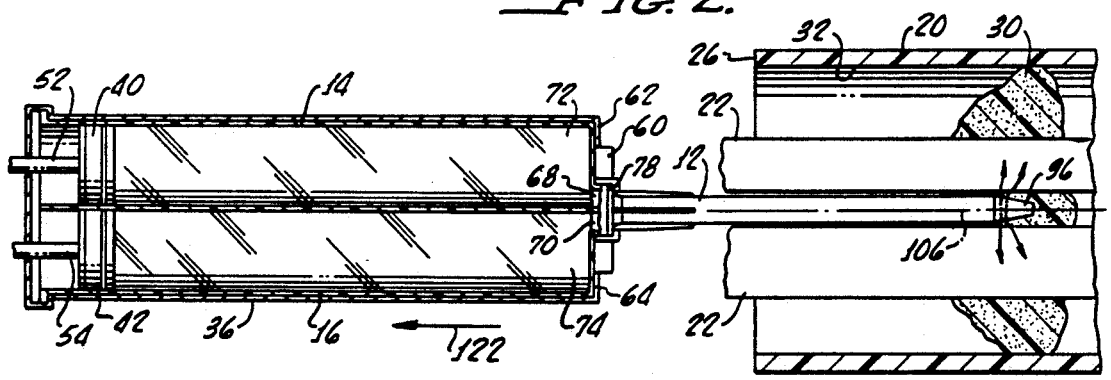
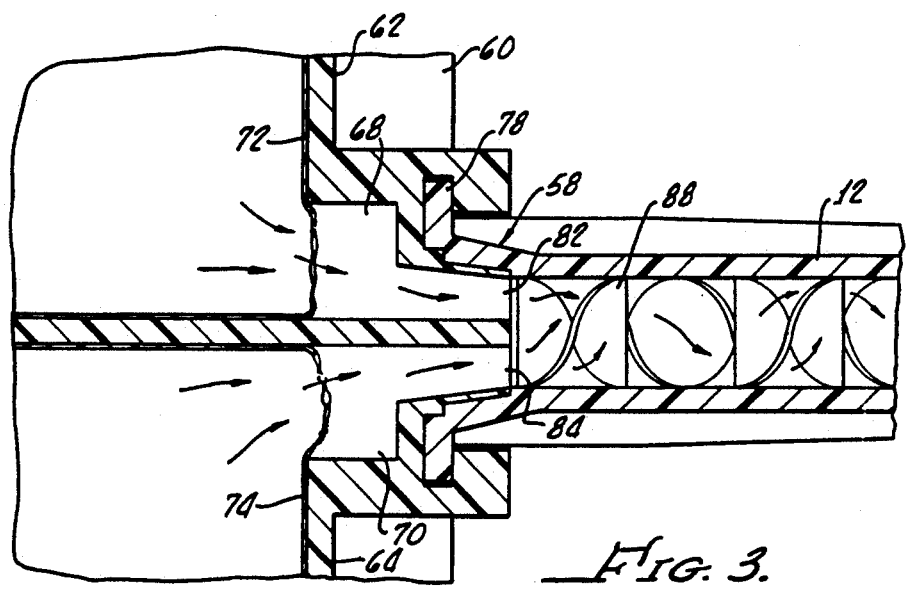

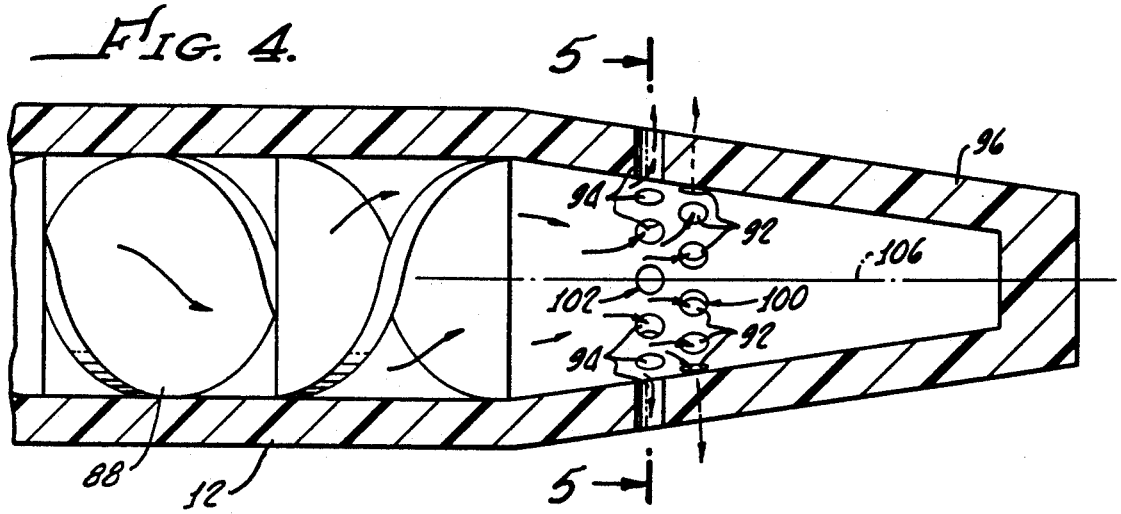
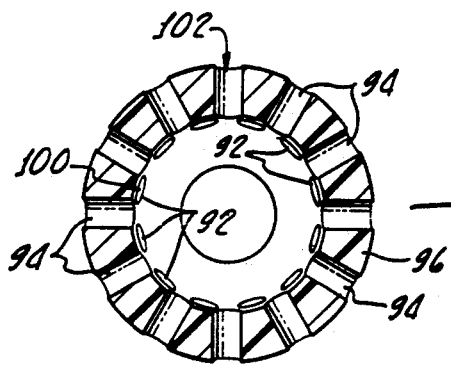
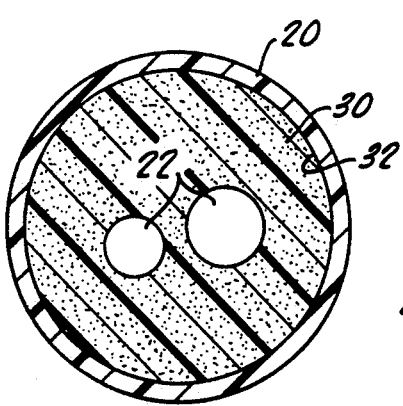 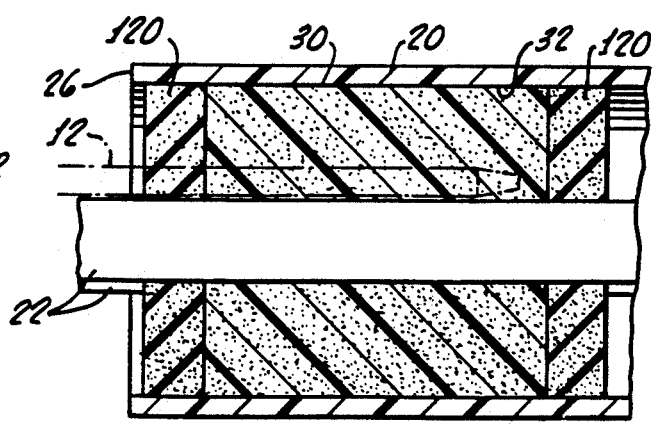

METHOD FOR SEALING CABLE CONDUITS

This application is a division of application Ser. No. 07/787,122, filed Nov. 4, 1991.

The present invention relates to an apparatus and method for the sealing of the end of cable conduits and the like.

Cable conduits are used and have many applications where electrical wires or optical fibers require protection from both mechanical and environmental insult. Such cable conduits may be formed of plastic or metal material with sufficient wall thickness to protect the cables disposed therein from mechanical abuse.

With proper sealing of conduits to one another, intermediate portions of the cable conduit also protect wires from environmental erosion which may be caused by fluids entering the cable conduit.

Eventually, however, the cable protection ceases at a terminus thereof with the wires exiting cable conduit for interconnection with electrical or optical devices.

The end of the cable conduit obviously provides the entry for fluids if not properly sealed. However, in many instances the seal in the end of the cable conduit is provided to prevent leakage of fluids that may enter the cable conduit, due to rupture thereof, from entering a secure vault or switching station into which the cable may terminate.

Heretofore, polyurethane encapsulents have been poured or injected into the cable conduit opening and around the cable to provide a seal of the cable conduit in and around the exiting of wires or optical fibers.

This operation has proved difficult and inefficient because of the nature of introducing the polyurethane into the cable, which has resulted in incomplete sealing of cable ends and waste of polyurethane.

It is therefore desirable to provide a method and apparatus for sealing conduits with a polyurethane foam or the like which efficiently use the polyurethane foam and provide effective sealing of the cable conduit terminus.

SUMMARY OF THE INVENTION

Spray nozzle apparatus in accordance with the present invention generally includes at least two compartments which provide means for holding a first and a second chemical composition in a spaced apart relationship. Separation of the two chemicals is essential in view of the fact that they are selected so that chemical reaction therebetween produces a foam capable of adhering to a conduit.

A piston is provided for simultaneously forcing the first and second chemical compositions out of the compartment means and into an elongate nozzle which has a proximal end in communication with the compartments. The elongated nozzle therefore provides a means for accepting the first and second chemicals and, importantly, commingling the chemicals.

The elongated nozzle may have a closed distal end to prevent longitudinal ejection of the mixed first and second chemicals. Importantly, in one embodiment of the present invention the nozzle may include means defining a plurality of holes on the circumference of the nozzle, proximate the distal end, for enabling ejection of commingled first and second chemical compositions in a direction generally perpendicular to an axis of the elongate nozzle.

In one embodiment of the present invention, the compartments are longitudinally attached to one another, and means may be provided for preventing unwanted leaking of the first and second chemical composition from the compartments.

More specifically, the means for preventing leaking of the chemical composition include a rupturable liner disposed in either one or both of the compartments for holding the first and second chemical compositions in the respective compartment means and in an airtight manner. In this manner, the apparatus may be stored for a long period of time without leakage of the first and/or second chemicals which may occur when O-ring type seals, or other elastomer seals, are used to seal the piston/syringe junction.

The liners may be formed of a material enabling rupture of the liner, spanning openings in the compartment which are in communication with the elongate nozzle, such rupturing enabling the passage of the first and second chemical compositions into the nozzle for commingling as they are forced from the compartments by the piston.

The length of the nozzle is selected for complete mixing of the two chemicals.

In order to preserve the first and second chemicals in the compartments, which are not commingled, the elongate nozzle's proximal end includes means for detachably mounting the elongate nozzle to the compartments in a manner preventing commingling of the first and second chemical compositions when the elongate nozzle is detached from the compartments.

In order to enhance commingling of the first and second chemicals, a stationary mixing element supported within the elongate nozzle provides a means for promoting commingling of the first and second chemical compositions as the composition passes through the elongate nozzle.

The corresponding method, in accordance with the present invention, for applying a foam for sealing of a cable conduit and the like includes the commingling of a first and second chemical composition selected so that a chemical reaction therebetween produces a foam capable of adhering to the cable conduit. Following the commingling of the chemical compositions, the mixture is introduced into the cable conduit along an axis thereof with the introduction of the commingled first and second compositions being in a direction generally perpendicular to the axis of the cable conduit before foaming occurs.

The introduction of the commingled chemicals in a direction perpendicular to the longitudinal axis of the conduit enables "wetting" of the conduit walls with the commingled but unfoamed chemicals, thereby insuring good adhesion and sealing of the foam to the conduit walls.

As hereinafter described, if the walls of the conduit are not "wetted," poor adhesion and sealing of the foam to the conduit walls is not achieved.

More particularly, the method in accordance with the present invention uses storage of the first and second chemical compositions in a handheld device in separate compartments. Commingling of the first and second chemical compositions is preceded by forcing of the compositions out of the separate compartments. Thereafter, the commingled first and second chemical compositions are introduced into the cable conduit in a direction generally perpendicular to the axis of the cable conduit and then allowed to foam and seal the cable conduit.

BRIEF DESCRIPTION OF THE DRAWINGS

The advantages and features of the present invention will be better understood by the following description when considered in conjunction with the accompanying drawings in which:

FIG. 1 is a perspective view of the nozzle apparatus in accordance with the present invention shown in a position for introducing commingled chemicals into the cable conduit;

FIG. 2 is a cross-sectional view of the apparatus in accordance with the present invention showing the introduction of the commingled chemicals into the end of the cable conduit and the beginning of foaming action;

FIG. 3 is an enlarged cross-sectional view of the proximal end of a nozzle in accordance with the present invention generally showing a mixing element disposed therein for commingling of chemicals;

FIG. 4 is an enlarged cross-sectional view of the distal end of a nozzle showing the relationship of the plurality of holes therein near the closed end for introducing the commingled chemical composition into the cable conduit;

FIG. 5 is a cross-sectional view taken along the line 5—5 of FIG. 4 showing the plurality of holes;

FIG. 6 is a cross-sectional view of the cable conduit having an end sealed with the foam by the apparatus of the present invention;

FIG. 7 is a cross-sectional view of the cable conduit taken along the line 7—7 of FIG. 6, showing the foam-filled conduit end;

DETAILED DESCRIPTION OF THE DRAWINGS

Figure 8:
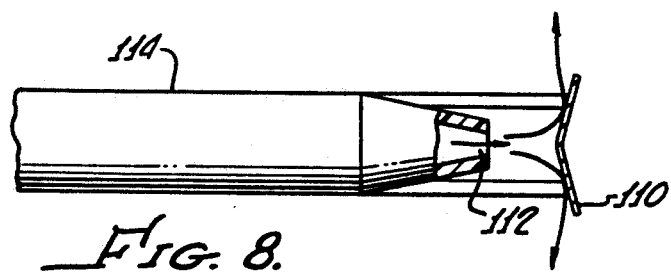
FIGS. 8, 9a and 9b are diagrams of alternative embodiments of the present invention.

Turning now to FIG. 1, there is shown a spray nozzle apparatus 10 in accordance with the present invention generally showing a nozzle 12 interconnected with compartments 14 16 and in a position for introducing, or ejecting, a commingled chemical composition into a cable conduit 20 having a plurality of wires or cables 22 for the purpose of sealing the conduit end with a foam 30 (see FIG. 2) as will be hereinafter described.

The compartments 14 16 may be formed from any suitable material such as plastic and may be joined along a longitudinal direction thereof and provide a means for holding a first and a second chemical composition in a spaced apart relationship. While only two compartments are shown, it should be appreciated that more compartments may be utilized depending upon the chemical compositions used to produce a foam which will adhere to the interior surface 32 of the conduit 20. While any number of chemical compositions may be utilized, the apparatus of the present invention may be used with success in introducing polyurethane foam into the conduit 20. Such compositions include hydroxyl and isocyanate groups to produce an adhesive foam having the urethane group—NH—CO—O—.

The compartments 14 16 may be disposed in a tray 36 for dispensing of commingled chemical compositions through the nozzle 12.

As shown in FIG. 2, pistons 40 42 provide a means for simultaneously forcing first and second chemical compositions out of the compartments 14 16 and into the nozzle 12. Any conventional caulk gun type handle 48 and pistol grip 50 may be utilized to drive rods 52 54 in a conventional manner for moving the pistons 40 42 within compartments 14 16.

The elongate nozzle 12 may include a proximal end 58 releasably attached to a bracket 60, which may be molded into fronts 62 64, for enabling communication with the compartments 14 16 through holes 68 70 through which the first and second chemical compositions are passed when they are forced from the compartments 14 16 by the pistons 40 42.

Preferably, rupturable liners 72 74 are provided as a means for preventing unwanted leaking of the first and second chemical compositions from the compartments 14 16. The liners 72 74, which may be formed of polyethylene or the like, provide means for holding the first and second chemical compositions in an airtight manner and may be constructed from any suitable material which enables rupture of the liners 72 74 in an area spanning the holes 68 70 so that pressure exerted by the pistons 40 42 cause the chemical compositions to burst through the liners 72 74 and go through the holes 68 70 and into the nozzle This is more clearly shown in FIG. 3 which also shows the proximal end 58 of the nozzle 12 as having a flange 78 which provides a means for detachably mounting the nozzle 12 to the compartments 14 16 for commingling of the chemical compositions therein. Upon removal of the nozzle 12 by rotating thereof so that the flange 78 can clear the bracket 60, chemical composition passing through the holes 68 70 and out of the separate openings 82 84 can be stopped at the openings 82 84 by a conventional stopper or the like (not shown), thereby ensuring isolation of the chemical compositions in the compartments 14 16 from one another.

In order to promote commingling of the first and second chemical compositions as they pass through the nozzle 12, a mixing element, or screw-like member 88, is provided. The member 88 is fixedly supported within the nozzle 12, and movement of the chemical compositions through the nozzle 12 and past the member promotes mixing thereof. The holes 92 form a first set 100, while holes 94 comprise a second set 102 with each set of holes being disposed in a plane generally perpendicular to a nozzle axis 106 with the hole sets 100 102 being longitudinally spaced apart along the nozzle axis 106. This is most clearly shown in FIG. 4 and FIG. 5 which show a cross-sectional view of the nozzle taken along the plane of the second set 102 of holes 94.

The holes 92 94 provide a means for enabling the ejection of commingled first and second chemical compositions in a direction generally perpendicular to the axis 106 of the elongate nozzle 12.

Figure 9A:
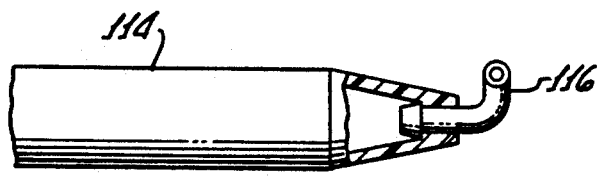
Figure 9B:
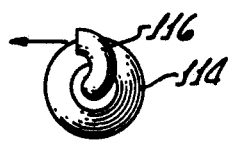

While means for ejection of commingled chemicals in a perpendicular direction to the nozzle axis is specifically shown as holes 92, 94, by way of example only, it should be appreciated that other means may be utilized. Examples of such means would include a deflector 110 adjacent a longitudinal opening 112 in a nozzle 114, as diagrammed in FIG. 8, or a rotating nozzle tip extension 116, as diagrammed in FIGS. 9a and 9b.

In operation, the cable conduit 20 is sealed by first inserting dams 120 into the end, thereafter inserting the nozzle end 96 between the dams 120.

Figure 10A:
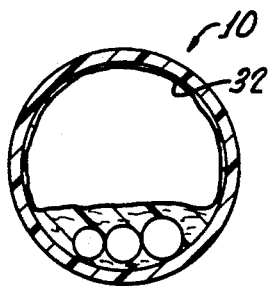
FIGS. 10a, 10b and 10c illustrate the method of the present invention.
Figure 10B:
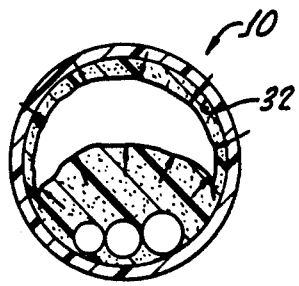
Figure 10C:
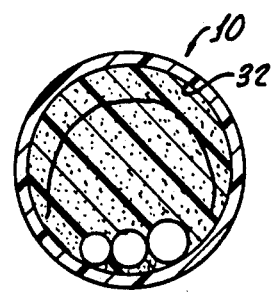

The viscous mixture is then forced directly into contact with the conduit inner surface, or wall, 32 in order to wet the surface thereof with unfoamed but commingled composition. Preferably, the entire inside circumference of the conduit inner surface 32 is wetted. Thereafter, the foaming action occurs with an effective seal to the conduit inner surface 32 as illustrated in FIGS. 10a-10c. Because all or most of the inner surface is wetted, the commingled composition, and thereafter the foam, adheres to the inner surface 32.

As shown in FIG. 2, as the foaming composition is ejected from the holes 92 94, the nozzle 12, along with the compartments 14 16, may move along the longitudinal axis of the cable in the direction of the arrow 122, if desired, to cause the filling of the conduit end 26 as shown in FIGS. 6 and 7.

As specifically illustrated in FIGS. 10a-10b, the method of the present invention enables wetting of the conduit wall 32 as hereinbefore described. After such wetting, the composition adheres thereto and foams inwardly to merge and seal with composition foaming outwardly within the conduit 10 from central portions thereof.

Figure 11A:
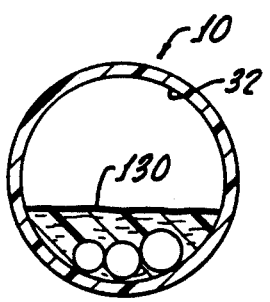
FIGS. 11a, 11b and 11c illustrate a prior art method of sealing conduits.
Figure 11B:
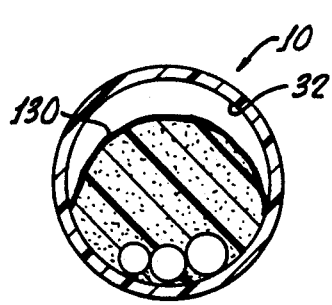
Figure 11C:
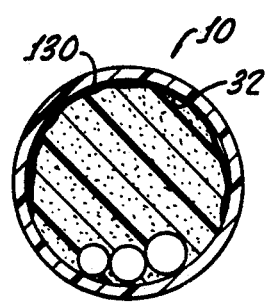

This is to be compared with prior art techniques illustrated in FIGS. 11a-11c wherein composition is injected into the conduit 10 along the longitudinal axis thereof. In this case, the composition foams and expands upwardly toward a "dry" conduit wall 32. The upper portion of the conduit wall is "dry" because no composition is directed toward, or impinges the upper wall portions.

During the foaming and expansion of the composition in a lower portion of the conduits, a skin 130 is formed on the expanding foam and as a result, the foam does not seal with the wall 26 when it comes in contact therewith.

Although there has been hereinabove described a particular arrangement of a spray nozzle apparatus and a method for sealing a conduit in accordance with the present invention, for the purpose of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the present invention as defined in the appended claims.

What is claimed is:

1. A method for applying a foam for sealing cable conduits, said method comprising the steps of:
    commingling a first and a second chemical composition, said first and second chemical compositions being selected so that chemical reaction therebetween produces a foam;
    introducing the commingled first and second chemical composition into said cable conduit at a point inside an end of said cable conduit and between cables disposed therein in a manner causing circumferential wetting of an inner surface of the cable conduit with commingled composition before foaming occurs;
    moving the point of introduction of commingled composition from inside of the conduit cable end toward the conduit cable end while continuously introducing commingled composition into the cable conduit between the cables therein without moving the cable conduit; and
    allowing the commingled first and second chemical compositions to foam and then seal to both the cable conduit inner surface and cables therein.

2. The method according to claim 1 wherein the commingled first and second chemical composition is introduced into the cable conduit in a plurality of directions, each generally perpendicular to the axis of the cable conduit.

3. The method of claim 2 wherein the commingled first and second chemical composition is introduced uniformly in at least two separated parallel planes within the cable conduit.

4. A method for applying a foam for sealing cable conduits, said method comprising the steps of:
    storing a first and a second chemical composition in a handheld device in separate compartments, said first and second chemical compositions being selected so that chemical reaction therebetween produces a foam capable of adhering to said cable conduit;
    forcing said first and second chemical composition out of the separate compartments;
    commingling the first and second chemical compositions in a nozzle of said handheld device;
    introducing the commingled first and second chemical compositions into said cable conduit at a point inside an end of said cable conduit and between cables disposed therein in a manner causing circumferential wetting of an inner surface of the cable conduit with commingled composition before foaming occurs;
    moving the point of introduction of commingled composition from inside of the conduit cable end toward the conduit cable end while continuously introducing commingled composition into the cable conduit between the cables therein without moving the cable conduit; and
    allowing the commingled first and second chemical compositions to foam and then seal to both the cable conduit inner surface and cables therein.

5. The method of claim 4 wherein the commingled first and second chemical composition is introduced into the cable conduit in a plurality of directions, each generally perpendicular to the axis of the cable conduit.

6. The method of claim 4 wherein the commingled first and second chemical compositions is introduced uniformly in at least two separated parallel planes within the cable conduit.

* * * * *